(12) United States Patent
Lindsey

(10) Patent No.: US 6,574,637 B1
(45) Date of Patent: Jun. 3, 2003

(54) BROWSER ORIENTED METHOD OF VIEWING DATABASE STRUCTURES

(75) Inventor: Terry P. Lindsey, The Woodlands, TX (US)

(73) Assignee: Orillion International, Inc., Houston, TX (US)

(*) Notice: Subject to any disclaimer, the term of this patent is extended or adjusted under 35 U.S.C. 154(b) by 0 days.

(21) Appl. No.: 09/511,575

(22) Filed: Feb. 23, 2000

(51) Int. Cl.[7] .............................. G06F 7/00; G06F 17/00
(52) U.S. Cl. ...................... 707/104.1; 707/100; 707/103
(58) Field of Search ............................ 707/4, 3, 100, 707/103–104.1; 395/500, 604, 600, 161

(56) References Cited

U.S. PATENT DOCUMENTS

| | | | | |
|---|---|---|---|---|
| 5,295,261 A | * | 3/1994 | Simonetti ................... 707/101 |
| 5,416,917 A | * | 5/1995 | Adair et al. .................. 707/10 |
| 5,437,027 A | | 7/1995 | Bannon et al. ......... 707/103 R |
| 5,444,842 A | * | 8/1995 | Bentson et al. .............. 345/804 |
| 5,721,901 A | | 2/1998 | Banning et al. ................ 707/4 |
| 5,737,592 A | | 4/1998 | Nguyen et al. ................ 707/4 |
| 5,740,421 A | * | 4/1998 | Palmon ....................... 707/100 |
| 5,768,578 A | | 6/1998 | Kirk et al. .................. 707/100 |
| 5,774,692 A | | 6/1998 | Boyer et al. ................... 707/3 |
| 5,797,136 A | | 8/1998 | Boyer et al. ................... 707/2 |
| 5,809,248 A | | 9/1998 | Vidovic ....................... 709/219 |
| 5,819,264 A | * | 10/1998 | Palmon et al. .................. 707/4 |
| 5,842,212 A | * | 11/1998 | Ballurio et al. ................. 707/1 |
| 5,864,842 A | * | 1/1999 | Pederson et al. ............... 707/2 |
| 5,895,454 A | * | 4/1999 | Harrington ................... 705/26 |
| 5,909,678 A | * | 6/1999 | Bergman et al. ............... 707/4 |
| 6,058,391 A | * | 5/2000 | Gardner ....................... 705/26 |
| 6,058,393 A | * | 5/2000 | Meier et al. ................... 707/10 |
| 6,108,664 A | * | 8/2000 | Nori et al. .................. 707/102 |

* cited by examiner

*Primary Examiner*—Greta Robinson
*Assistant Examiner*—Linh Black
(74) *Attorney, Agent, or Firm*—Baker Botts L.L.P.

(57) ABSTRACT

A machine-executed method and apparatus for displaying the structure of a plurality of relational databases of arbitrary structure in a browseable format is disclosed. Each database comprises a plurality of tables. Each table comprises a plurality of fields. Each table and each field has a name. The method entails determining the respective structures of the plurality of relational databases, integrating the respective structures of the plurality of relational databases into a front-end integrated data structure, removing the conflicting names of tables and fields in the front-end integrated data structure, performing a join operation to establish a link among selected fields in at least two respective tables, and displaying the front-end integrated data structure as a hierarchical containment tree of folders.

25 Claims, 9 Drawing Sheets

BROWSER ORIENTED METHOD OF VIEWING DATABASE STRUCTURES

BACKGROUND OF THE INVENTION

1. Field of the Invention

The present invention relates generally to the field of software applications. More particularly, it concerns a software program for browsing the data structure of a plurality of arbitrary relational databases.

The microfiche appendix to this specification contains copyrighted computer program source code that is owned by the assignee of this application. Permission is granted to make a single facsimile copy of the microfiche appendix, in microfiche form, for each facsimile copy that is made of any patent issuing from this application or from any application claiming priority hereon. All other rights in the computer program source code, under copyright or otherwise, are reserved.

2. Description of Related Art

A database is a collection of files for storing related information. A relational database is a database in which a collection of tables contains database records where each record within a single table is comprised of a set of fields common to all records in that table.

In some relational databases, the data can be accessed along complex dimensions using the standard query language (SQL). Such databases make it convenient to look tip information based on specifications derived from a semantic frame.

Furthermore, each database has a data structure. A data structure is defined as a physical or logical relationship among data elements, designed to support specific data manipulation functions.

Relational databases have become the subject of significant recent interest, not only because of the increasing volume of data being stored and retrieved by these computerized databases but also by virtue of the data structures across these databases. Many types of relational databases exist today, e.g., MICROSOFT ACCESS®, manufactured by the Microsoft Corporation of Redmond, Wash., ORACLE®, manufactured by the Oracle Corporation of Redwood Shores, Calif., and SYBASE®, manufactured by Sybase, Inc. of Dublin, Calif., etc. As a result, a variety of types of databases and database structures exist. As the need to cross-reference one record from one database with another records in another database increases, the ability to view data structures across different relational databases all at one becomes important. Currently, it is believed that viewing data structures across a plurality of relational databases has been thought to be difficult, if not impossible, primarily due to the incompatibility of the various databases. The present invention provides a solution to this problem by giving a database user the ability to view the data structure of a plurality of arbitrary relational database structures all at once.

SUMMARY OF THE INVENTION

A machine-executed method and apparatus are provided to display the data structure of a plurality of relational databases of arbitrary structure in a browseable formnat. Each database comprises a plurality of tables. Each table contains one or more fields and one or more records. Each table and each field has a name. The method includes several steps.

The respective structure of the plurality of relational databases is determined, e.g.,. by a graphical-user-interface data entry technique or by manually editing one or more files. Each database may have its own arbitrary structure. The respective structures are integrated into a front-end integrated data structure. This entails (a) removing the conflicting names of tables and fields in the front-end integrated data structure, and/or (b) performing a join operation to establish a "link" between selected fields in at least two respective tables, where each table is in a separate respective database.

In removing the conflicting names, a name is selected, followed by displaying a cross-reference list of uses of the selected name in the plurality of relational databases. The selected name is then edited with another name more suitable to the user, referred to as an "alias." Once the selected name is renamed with its "alias" name, the "alias" name is displayed in lieu of the selected name.

When portions of two or more database tables are joined to create a "virtual" table by definition, the database tables contain at least one related field. For purposes of the "virtual" table, the selected field in one database table is designated as a "primary key," while the corresponding selected field in the other joined database table is designated as a "foreign key."

Once the structures of the plurality of relational databases are integrated into the front-end integrated data structure, the front-end integrated data structure is displayed as a hierarchical containment tree of folders. That is, the structure is displayed along with a category of folders. Each folder contains a category of folders below it within the hierarchy.

In an alternative embodiment, once the respective structures are determined, a combined list of tables in the respective databases is displayed; a table in the list is selected; a list of fields for the selected table is displayed; a field in the list of fields is selected; and the selected field descriptor information for the selected field is displayed. Field descriptor information generally contains, among other pertinent information, a cross-reference list of uses of the selected field in the respective databases.

The present invention has a number of advantages, among them being the ability to view, edit, or reorganize the data structures of one or more relational databases in a browseable format. Another advantage of the present invention is the flexibility to rename the fields and tables of the various relational databases with other names more suitable to the user. This feature may help the user to organize the information he obtained from the integrated data structure.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

Figure 1:
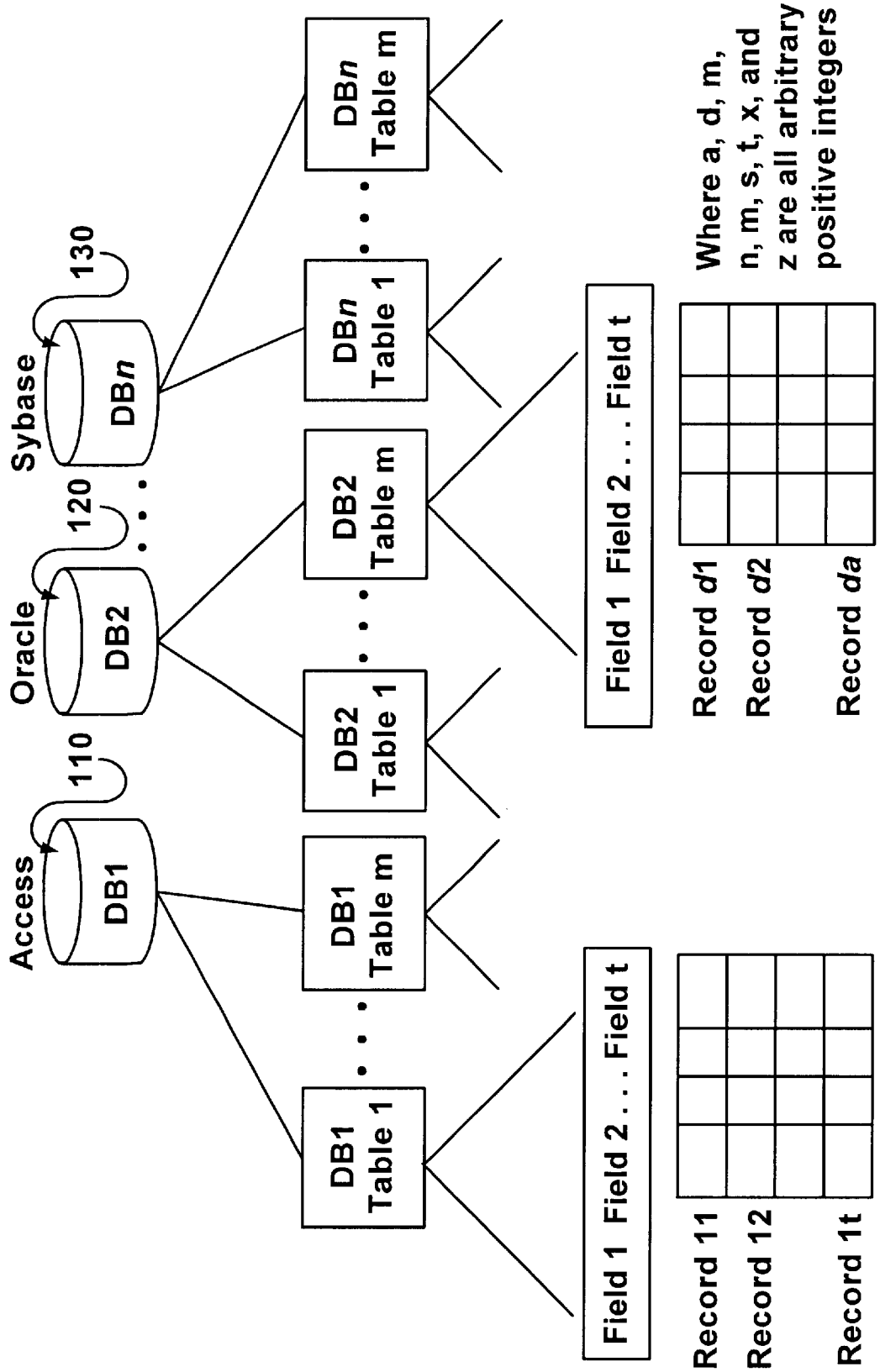
FIG. 1 schematically depicts a hypothetical plurality of relational databases and a structural breakdown of one of the databases.

While the invention is susceptible to various modifications and alternative forms, specific embodiments thereof have been shown by way of example in the drawings and are described in detail in this specification. It should be understood, however, that the description of specific embodiments is not intended to limit the invention to the particular forms disclosed. The intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 1 shows a plurality of relational databases and their typical structural breakdown. Each database is broken down to m number of tables, as shown by $Table_1$ of $DB_1$ up to $Table_m$ of $DB_1$. Each table is further broken down to a set of fields. Each field can be organized as $Field_1$, $Field_2$, up to $Field_t$. Each table contains one or more records, e.g., $Record_{11}$, $Record_{12}$, and $Record_{11}$, where each record consists of the same set of fields (whether or not any particular field in a given record actually contains non-null data).

One aspect of the present invention is the collection and display of structure information from several arbitrary relational databases organized according to different file format specifications. For example, one database might be a MICROSOFT ACCESS® 97 database 110, another database might be an ORACLE® 8i database 120, still another might be a SYBASE® System 11 database 130. In accordance with the invention, the structure information may be displayed in a browseable representation. Once the structure information has been determined and displayed, it can be manipulated in virtually any desired way, as well known to those of ordinary skill having the benefit of this disclosure.

One approach to implementing this aspect of the invention is to establish a file that contains configuration information describing the databases it represents and any additional structural information added by the user. Such a file can be named by its user, in the same fashion that word processing documents are named and saved. The file may also be updated, edited, and re-saved.

A first step of building this browseable structure for one or more relational databases is to describe each database to be viewed to the program, thereby determining the structure of the databases. To accomplish this, the program user may enter information describing the database, such as, its IP address (or server name) and access methodology (e.g., JDBC, SQL, IP Sockets, etc.). This information may be entered using a data-entry routine in a suitably designed computer program (e.g., a dialog box with fill-in-the-blank fields, drop-down menus, check boxes, radio buttons, and the like), and saved in the file. (Alternatively, of course, the information may be entered manually by directly editing the appropriate file or files, e.g., with a text editor.) If a list or table of such database information is already maintained, the information may be entered by designating the particular databases from the list or table, e.g., with point-and-click or drag-and-drop techniques. The saved information may be used whenever database access is required.

Figure 2:
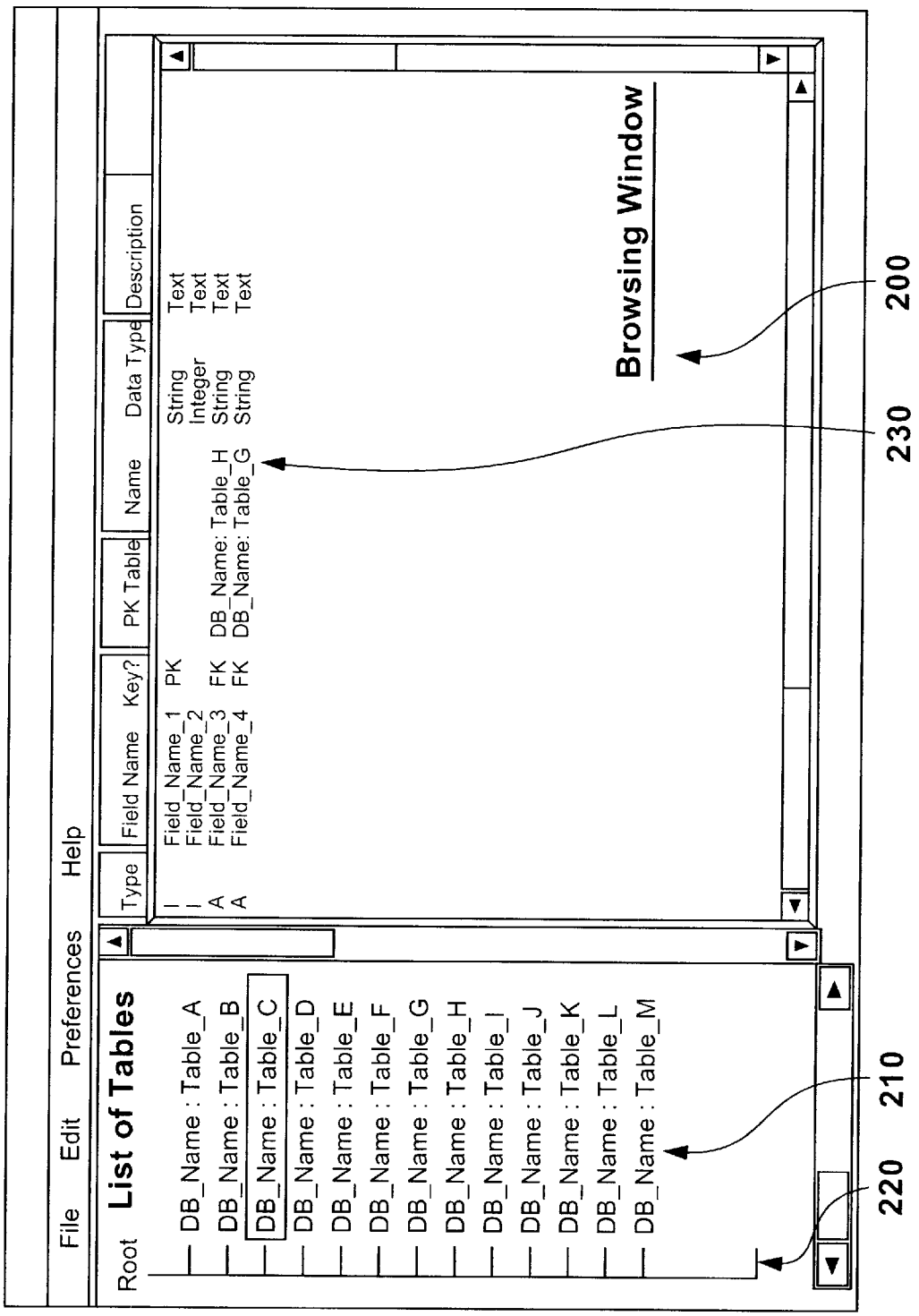
FIG. 2 illustrates a display of a root directory and a corresponding list of table names in a browsing window.

Referring to FIG. 2, when the information has been provided to the program, the program accesses the data dictionary of each database and extracts table structures, field names, data types, definitions, and all other structural information. (Alternatively, such information can be provided as described in the previous paragraph.) This information may be displayed to the user in a browsing window 200, as illustrated in FIG. 2. Prior to any editing by the user, the program displays the extracted database as a list of table names in a root directory. As an example, FIG. 2 illustrates a list of table names 210 in a root directory 220. Compared to a standard PC file browser, the table names correspond to a special kind of subcategory. When one of these table names is opened for browsing, e.g., by selecting a table name (such as "Table_C" in FIG. 2), the field names of the selected table are listed as if they were files, e.g., the list of field names 230 in FIG. 2. Thus, each field name corresponds to a leaf on an inverted tree. Initially, the tree is likely to be flat and may be rather burdensome to manipulate; however, as further structure is added, navigation through the tree becomes more intuitive and rapid.

Figure 3:
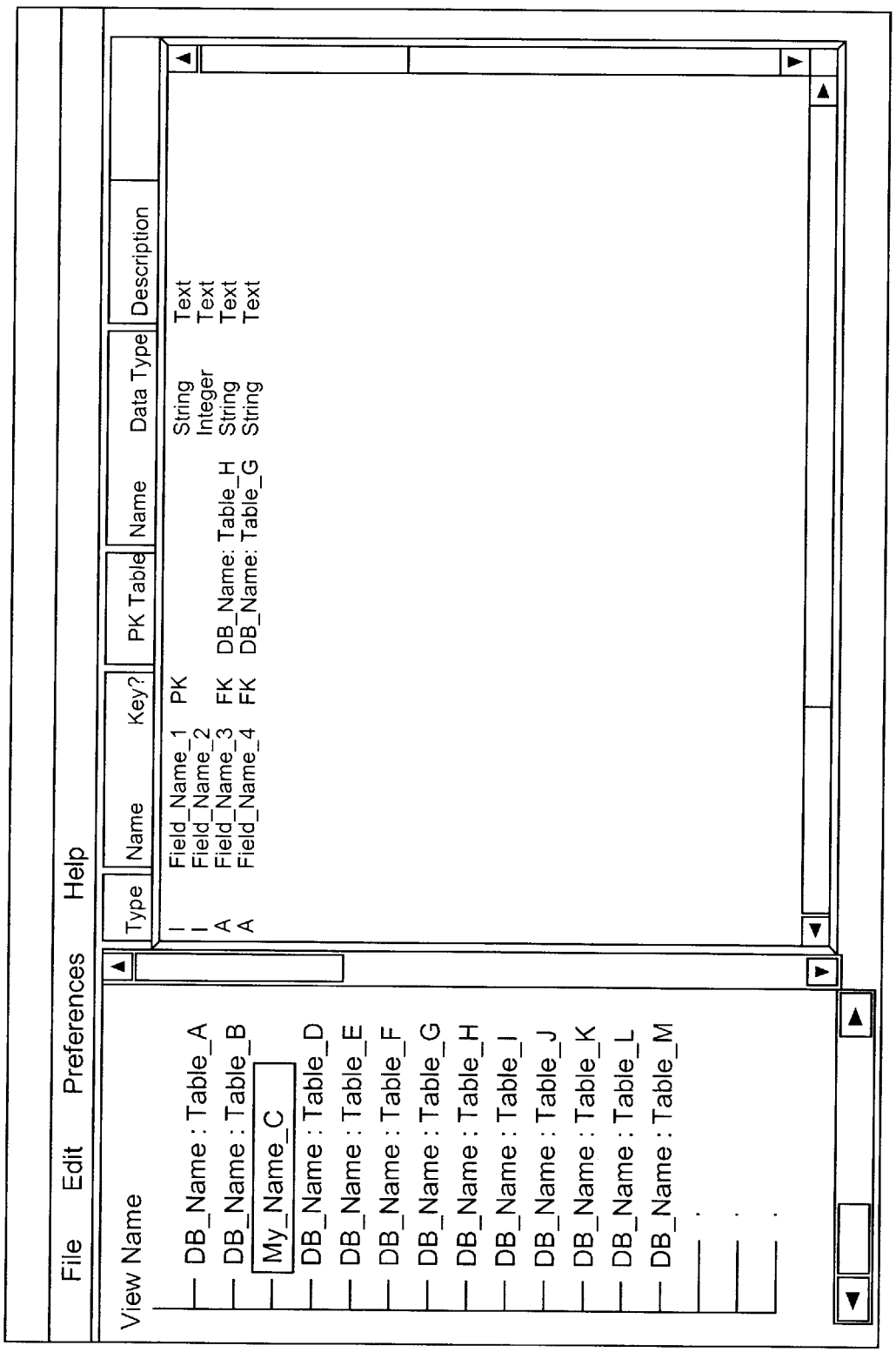
FIG. 3 illustrates a display that outlines a user removing conflicts among names.

Referring to FIG. 3, one of the problems with integrating a data structure from an arbitrary set of relational databases is that some databases may use the same table names or field names for different record-content definitions and some may use different names in different databases for the same or similar content definitions. (By analogy, the word "chips" in the United States refers to potato chips but in England the same word refers to what Americans would call French fries, i.e., the same name is used to identify different content definitions. As another analogy, in United States postal addresses, the numbers immediately after the state are called the ZIP Code; in other countries, the same kind of number may be referred to as a postal code, i.e., different names are used to label the same or similar content definitions.)

FIG. 3 illustrates a display in which a user may remove conflicts among names. To remove conflicts among names, the user sends an electronic signal by selecting a name, e.g., selecting table name My_Name_C by clicking or slow-double-clicking on it, and editing or replacing the name with a name more suitable to the user. Such edited or replacement names are called "aliases" and do not affect the original database, but can be used by the user to reference the table name or field name for which it is an alias. In one illustrative embodiment, slow double-clicking on a table name opens an edit window where an "alias" for that table can be edited or changed; the alias is initially set to "database_name:tablename" as specified in the database.

Figure 4:
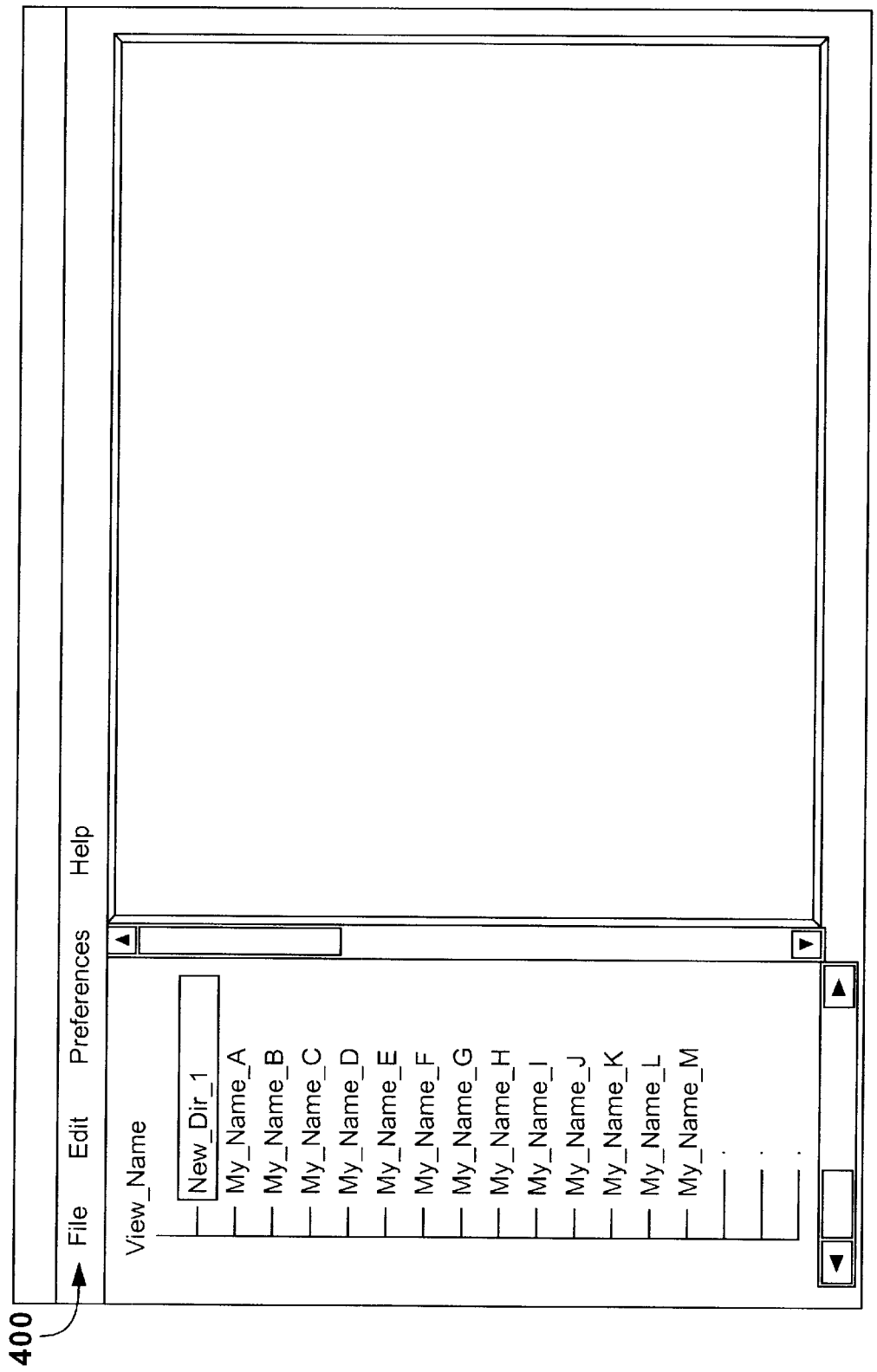
FIG. 4 illustrates a display in which a new subdirectory is created.
Figure 5:
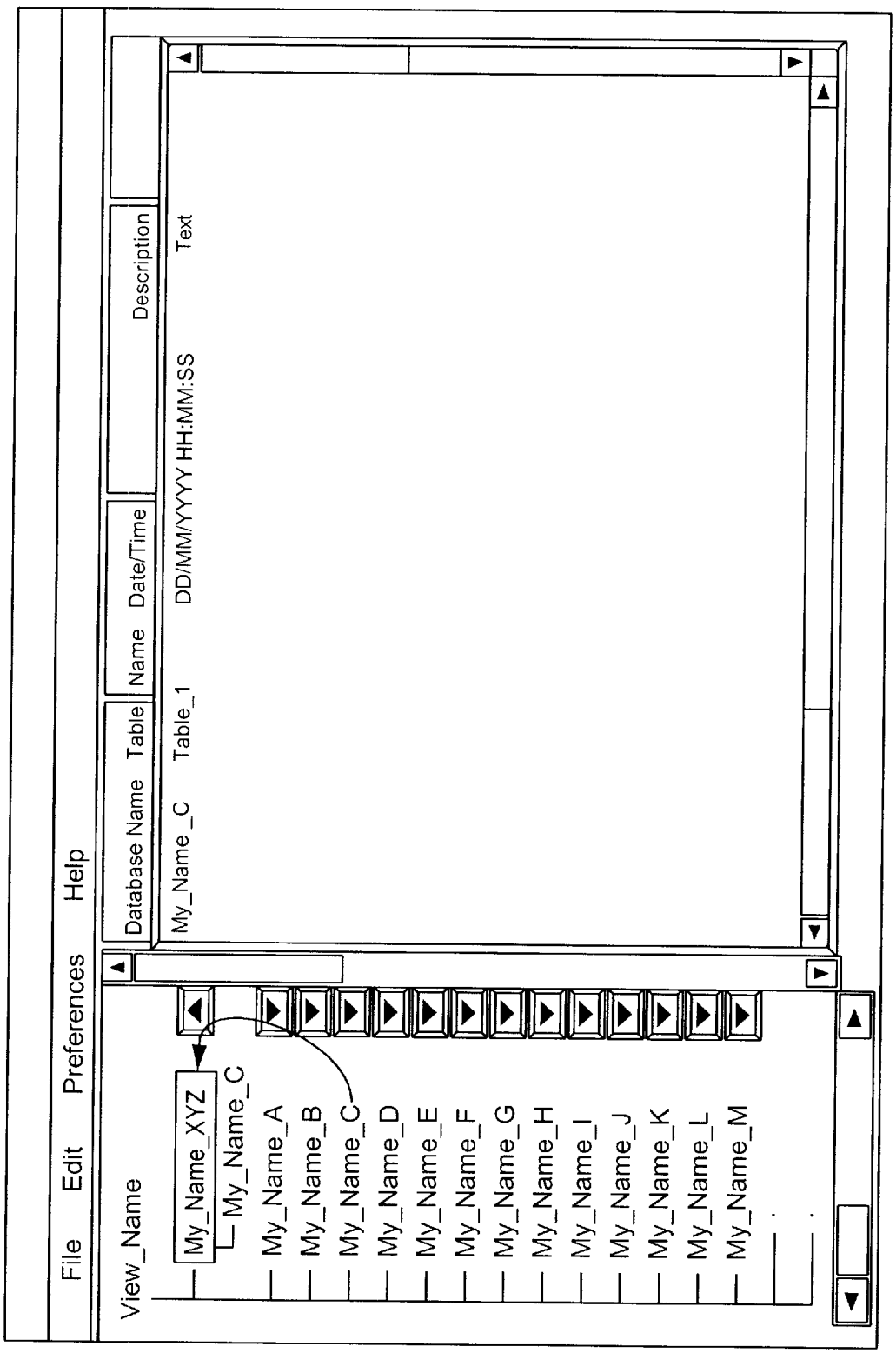
FIG. 5 illustrates a display in which a table is dragged and dropped into a subdirectory.

As shown in FIG. 4, the user may create new subdirectories by selecting the directory in which the new subdirectory is to be established, then selecting "New" from the "File" menu 400. The program then presents the user with a choice of several new things that can be created: "Folder" will be one choice. Upon selecting "Folder", the program creates a new subdirectory called "New_Dir_1," (or "New_Dir_2," if "New_Dir_1" already exists, and so on), within the selected directory. The new subdirectory is initially empty. At any subsequent time, the user may select the new subdirectory, e.g., by performing a slow double click on "New_Dir_1," and enter a more appropriate name. The user may then select one or more tables or directories and drag-and-drop them into the newly formed subdirectory. For example, as shown in FIG. 5, table My_Name_C was selected and dragged-and-dropped into the subdirectory My_Name_XYZ. The newly created subdirectory has the same structure as the selected tables.

By repeating the steps displayed in FIGS. 3–5, a new browseable integrated data structure can be developed to act as a front-end to the table structures contained in the databases. This front-end allows the users to manipulate data from a common interface. The selected front-end interface can resemble a conventional browser of the kind widely used in browsing file systems (see, e.g., WINDOWS EXPLORER®, manufactured by the Microsoft Corporation). Alternatively, the data can be provided to a conventional Web server and "served up" to one or more Web browsers as well known to those of ordinary skill having the benefit of this disclosure.

Figure 6:
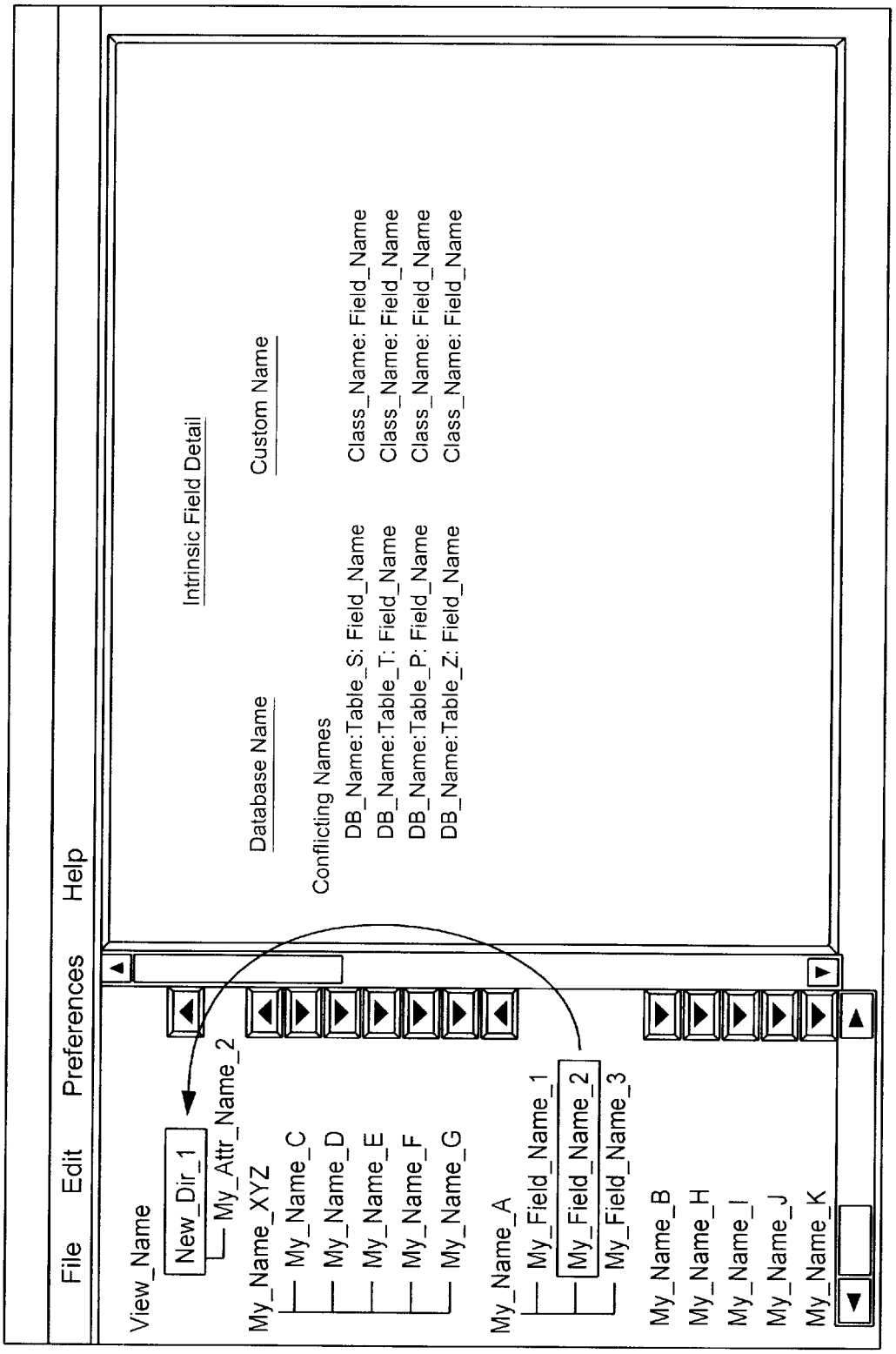
FIG. 6 illustrates a display in which a "virtual table" is created by using a link between fields.

Referring to FIG. 6, with the program embodiment of the present invention the user is able to create new "virtual" tables by creating a reference called a "link." In a specific embodiment, links are created, as shown in FIG. 6, by selecting a field name and dragging-and-dropping the selected field name into an empty directory, creating a "virtual" table. In FIG. 6, for instance, the field name My_Field_Name_1 is dragged-and-dropped into the empty directory New_Dir_1. By following this procedure, any empty directory may be designated as a "virtual" table. In this case, the field names are assigned to a "virtual" table. Alternatively, a field name may be dragged and dropped into an existing table-directory.

When two or more database tables are joined to create a "virtual" table, by definition, the database tables contain a common field. For purposes of the "virtual" table, the field in one of the database tables is designated as a "primary key," while the corresponding field in the other joined database table is designated as a "foreign key." (The terms primary keys and foreign keys are well known in the database arts.) Furthermore, field names from different databases may be associated in a "virtual" table so long as there is sufficient structural information to perform the "join."

Figure 7:
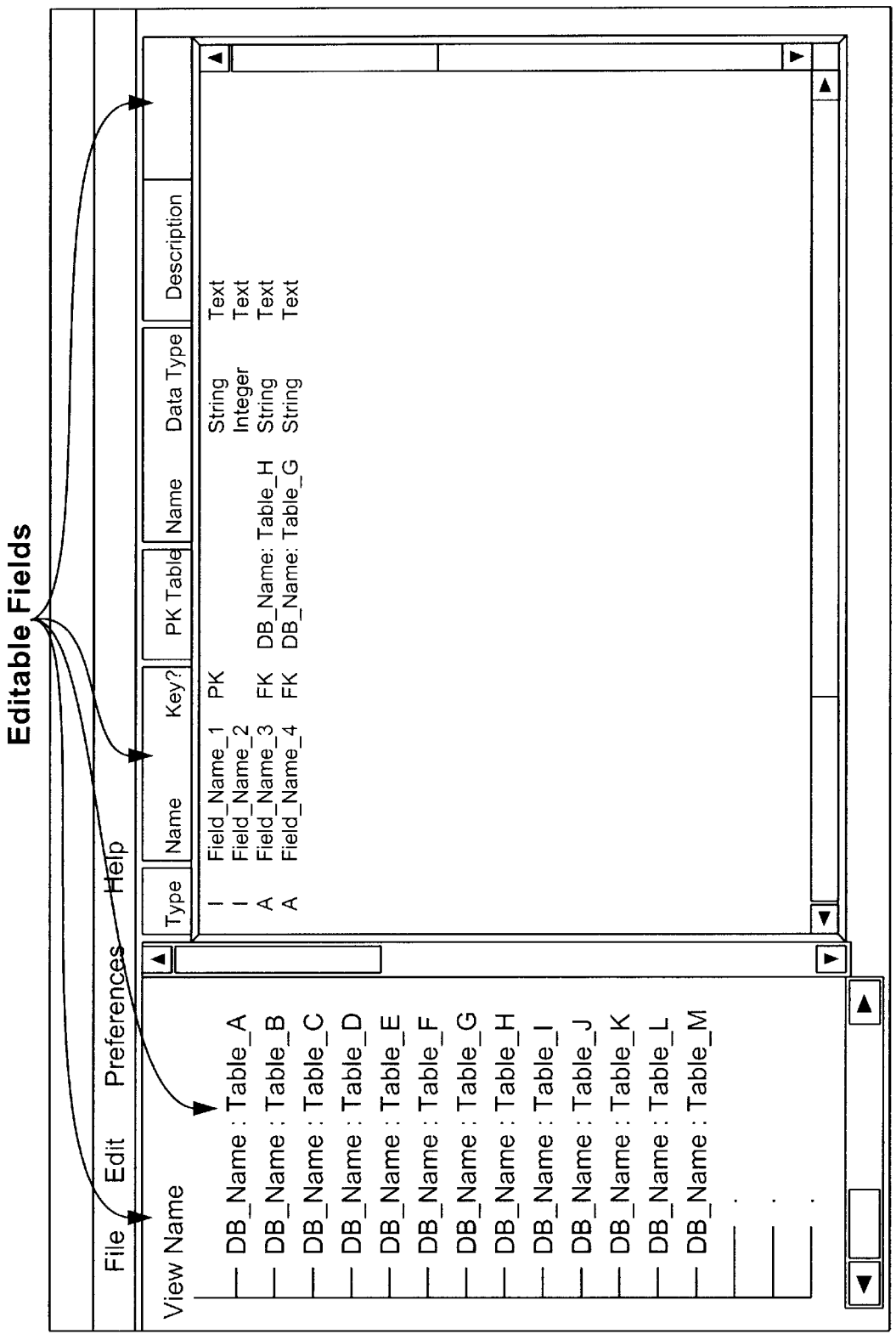
FIG. 7 illustrates a display of hierarchical containment tree of folders of a table.

Referring to FIG. 7, once the browseable integrated data structure is completed, the user may view the directories, tables, or fields of the integrated data structure by selecting a desired category of folders. Each category displays a particular set of information. Also, each category is displayed as a folder within a hierarchical containment tree of folders. That is, each folder contains the categories below it within the hierarchy. For II example, if a directory-name is selected, the contents of the directory, in the form of sub-directory names and table names, will appear together with other selected information. On the other hand, if a table name is selected, the contents of the table, in the form of field names will appear together with other selected information. As an example, FIG. 7 shows that the field names Field_Name_1 to Field_Name_4 are displayed on the browsing window 200 when the table name My_Name_C is selected.

Figure 8:
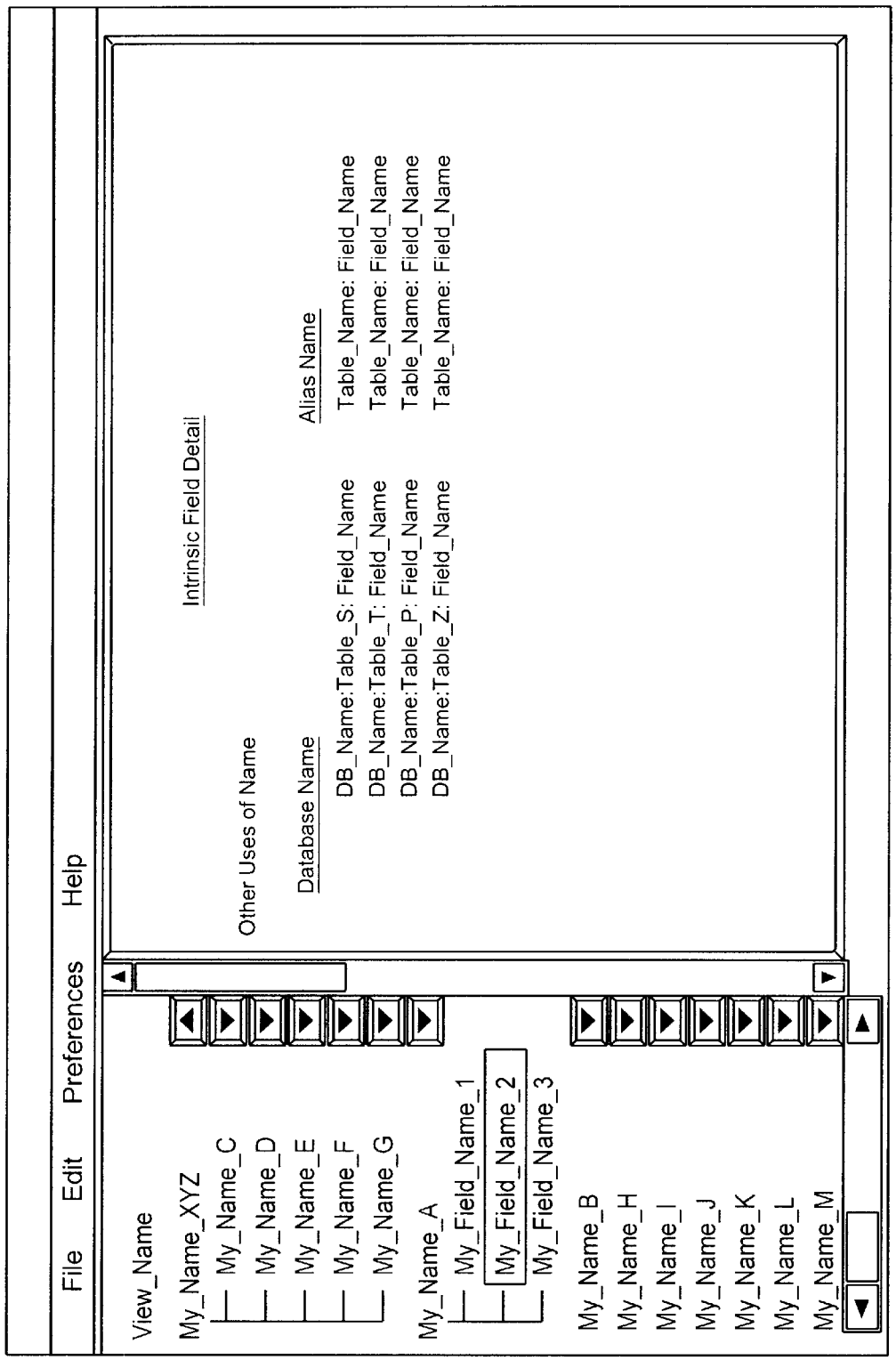
FIG. 8 illustrates a display of information contained in an intrinsic field.
Figure 9:
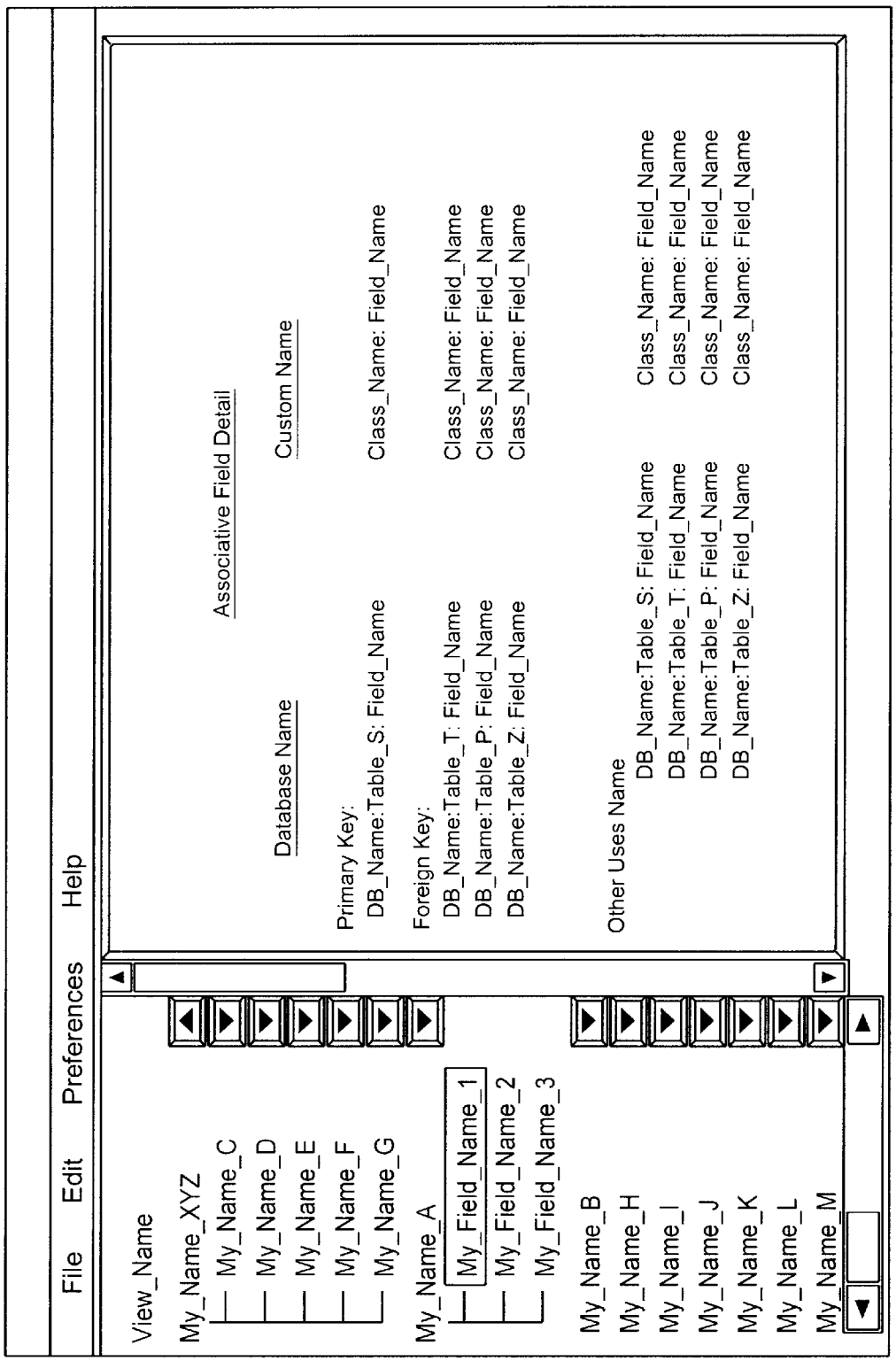
FIG. 9 illustrates a display of information contained in an associative field.

Referring to FIGS. 8 and 9, if a field name is selected, its field descriptor information, which consists of a cross-reference information and other related documentation, will appear. For purposes of this illustration, two types of fields exist: Intrinsic and associative.

My_Field_Name_2 in FIG. 8 is an example of an intrinsic field. An intrinsic field contains information that pertains to a descriptor of the record of which it is a part and does not point to any other database record. In one embodiment, a conflict in the field definitions is displayed on the screen. In FIG. 8, for example, the window labeled "Intrinsic Field Detail" lists that information. The field names will appear in both the database name and their alias name, if an alias has been entered or provided.

Associative fields, on the other hand, contain information that pertains to a relationship between a record in a table and a record or set of records in another table. An example of an associative field is a foreign key. FIG. 9 shows an example of information contained in an associative field, e.g., My_Field_Name_2. The database and table names where the field name appears may also be displayed.

The present invention, in its various aspects and embodiments, is useful for browsing all types of database structures. It is also substantially compatible with all types of software applications and database languages.

It will be apparent to those of ordinary skill having the benefit of this disclosure that any of the foregoing variations may be implemented by programming one or more suitable general-purpose computers having appropriate hardware. The programming may be accomplished through the use of a program storage device readable by the computer and encoding a program of instructions executable by the computer for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions is immaterial here.

The particular embodiments disclosed above are illustrative only, as the invention may be modified and practiced in different but equivalent manners apparent to those skilled in the art having the benefit of the teachings. Furthermore, no limitations are intended to the details of construction or design shown, other than as described in the claims below. It is therefore evident that the particular embodiments disclosed above may be altered or modified and all such variations are considered within the scope and spirit of the invention. Accordingly, the protection sought is as set forth in the claims below.

What is claimed is:

1. A machine-executed method of creating a front-end integrated data structure representing a plurality of relational databases of arbitrary structure, comprising:
   (a) determining the respective structures of the plurality of relational databases; and
   (b) integrating the respective structures of the plurality of relational databases into the front-end integrated data structure by editing the front-end integrated data structure.

2. The method of claim 1, wherein editing the front-end integrated data structure comprises creating at least one new directory in the front-end integrated data structure.

3. A machine-executed method of creating a front-end integrated data structure representing a plurality of relational databases of arbitrary structure, comprising:
  (a) determining the respective structures of the plurality of relational databases; and
  (b) integrating the respective structures of the plurality of relational databases into the front-end integrated data structure,
  wherein each database comprises a plurality of tables, each table comprising a plurality of fields, each table having a name, and each field having a name, wherein editing the front-end integrated data structure comprises changing the name of at least one table.

4. A machine-executed method of creating a front-end integrated data structure representing a plurality of relational databases of arbitrary structure, comprising:
  (a) determining the respective structures of the plurality of relational databases; and
  (b) integrating the respective structures of the plurality of relational databases into the front-end integrated data structure,
  wherein each database comprises a plurality of tables, each table comprising a plurality of fields, each table having a name, and each field having a name, wherein editing the front-end integrated data structure comprises changing the name of at least one field.

5. A machine-executed method of creating a front-end integrated data structure representing a plurality of relational databases of arbitrary structure, comprising:
  (a) determining the respective structures of the plurality of relational databases; and
  (b) integrating the respective structures of the plurality of relational databases into the front-end integrated data structure,
  wherein the front end integrated data structure is stored in a browseable representation.

6. A machine-executed method of creating a front-end integrated data structure representing a plurality of relational databases of arbitrary structure, comprising:
  (a) determining the respective structures of the plurality of relational databases;
  (b) displaying a representation of the respective structures of the plurality of relational databases, referred to as the front-end integrated data structure, to a user;
  (c) receiving at least one editing command from the user;
  (d) executing the at least one editing command; and
  (e) saving the front-end integrated data structure in a machine-readable file.

7. The method of claim 6, wherein the front-end integrated data structure is stored in a browseable representation.

8. The method of claim 6, wherein the at least one editing command comprises creating at least one new directory in the front-end integrated data structure.

9. The method of claim 6, wherein each database comprises a plurality of tables, each table comprising a plurality of fields, each table having a name, and each field having a name, the at least one editing command comprises changing the name of at least one table.

10. The method of claim 6, wherein each database comprises a plurality of tables, each table comprising a plurality of fields, each table having a name, and each field having a name, the at least one editing command comprises changing the name of at least one field.

11. A machine-executed method of displaying the structure of a plurality of relational databases of arbitrary structure, each database comprising a plurality of tables, each table comprising a plurality of fields, each table having a name, and each field having a name, the method comprising:
  (a) determining the respective structures of the plurality of relational databases;
  (b) integrating the respective structures of the plurality of relational databases into a front-end integrated data structure;
  (c) removing the conflicting names of tables and fields in the front-end integrated data structure;
  (d) performing a join operation to establish a link among selected fields in at least two respective tables; and
  (e) displaying the front-end integrated data structure as a hierarchical containment tree of folders.

12. The method of claim 11, wherein removing the conflicting names comprises:
  replacing the conflicting names with an alias name; and
  displaying the alias name in lieu of the conflicting names.

13. The method of claim 11, further comprising:
  (f) displaying the front-end integrated data structure in a browseable representation.

14. A machine-executed method of displaying the structure of a plurality of relational databases of arbitrary structure, each database comprising a plurality of tables, each table comprising a plurality of fields, each table having a name, and each field having a name, the method comprising:
  (a) determining the respective structures of the plurality of relational databases;
  (b) displaying a combined list of tables in the respective databases;
  (c) receiving a signal designating a table in the list of tables as a selected table and displaying a list of fields for the selected table; and
  (d) receiving a signal designating a field in the list of fields as a selected field and displaying the selected field descriptor information for the selected field.

15. The method of claim 14, wherein the field descriptor information comprises a cross-reference list of uses of the selected field in the respective databases.

16. The method of claim 14, further comprising:
  (e) displaying the structure of a plurality of relational databases in a browseable representation of a hierarchical containment tree of folders.

17. The method of claim 14, further comprising:
  (e) receiving at least one editing command from the user, the at least one editing command designating an operation to be performed on a selected table or on a selected field; and
  (f) executing the at least one editing command.

18. The method of claim 14, further comprising:
  (e) displaying, for a selected name, a cross-reference list of uses of the selected name in the plurality of relational databases.

19. The method of claim 17, wherein the at least one editing command comprises the steps of:
  receiving an alias designator which designates an alias for a selected name; and
  displaying the alias in lieu of the selected name.

20. The method of claim 17, further comprising:
  (g) storing a representation of the relationship between the alias and the selected name.

21. The method of claim 14, further comprising:

(e) performing a join operation to establish a link among selected fields in at least two respective tables in at least two respective different databases; and (f) displaying the results of the join operation as a table within a hierarchical containment tree of folders, referred to as a virtual table.

22. The method of claim 14, further comprising:

(e) creating a folder;

(f) receiving at least one editing command from the user, the at least one editing command designating an operation to be performed on the folder; and (g) executing the at least one editing command.

23. The method of claim 22, wherein the at least one editing command comprises:

(1) selecting at least one table of the plurality of relational databases; and (2) filing the at least one table of the plurality of relational databases into the folder.

24. A computer-readable medium encoded with instructions that, when executed by a computer, perform a method in accordance with a specified one of claims 1 through 23.

25. A computer programmed to perform a method in accordance with a specified one of claims 1 through 23.

* * * * *